United States Patent [19]
Klees

[11] Patent Number: 5,216,878
[45] Date of Patent: Jun. 8, 1993

[54] MIXED EXHAUST FLOW SUPERSONIC JET ENGINE AND METHOD

[75] Inventor: Garry W. Klees, Mercer Island, Wash.

[73] Assignee: The Boeing Company, Seattle, Wash.

[21] Appl. No.: 722,934

[22] Filed: Jun. 28, 1991

[51] Int. Cl.$^5$ .................... B63H 11/00; F02K 3/02
[52] U.S. Cl. .................... 60/204; 60/226.3; 60/262
[58] Field of Search ............ 60/204, 226.1, 226.3, 60/261, 262, 271; 181/215, 216, 219, 220

[56] References Cited

U.S. PATENT DOCUMENTS

| | | | |
|---|---|---|---|
| 4,052,847 | 10/1977 | Rodgers et al. | 60/262 |
| 4,501,393 | 2/1985 | Klees et al. | 181/215 |
| 4,638,631 | 1/1987 | Debeneix et al. | 60/226.3 |

FOREIGN PATENT DOCUMENTS 2082259 3/1982 United Kingdom ............ 60/262

OTHER PUBLICATIONS

Thrust Augmenting Ejectors, Part I, by Alperin & Wu at vol. 21, No. 10 of the AIA Journal, Jun./1982, pp. 1428-1436.
Thrust Augmenting Ejectors, Part II, by Alperin & Wu at vol. 21, No. 12 of the AIA Journal, Jun./1982, pp. 1698-1706.
NASA Contractor Report 177419 by Dr. Wu prepared for the Ames Research Center in Jul. of 1986, Ames, Iowa, pp. 1-28.
Compound-compressible Nozzle Flow by Bernstein, Heiser & Havenor presented at AIAA 2nd Propulsion Joint Specialist Conference at Colorado Springs, Colo., Jun. 13-17, 1966, pp. 1-71.

Primary Examiner—Richard A. Bertsch
Assistant Examiner—Howard R. Richman
Attorney, Agent, or Firm—Hughes & Multer

[57] ABSTRACT

A supersonic jet engine installation for improved noise abatement and thrust augmentation. There is an intake section, an engine, a mixing section, an exhaust section, and a secondary air passageway. Ambient air is directed into the engine and also into the secondary air passageway. The exhaust from the engine and the flow from the secondary air passageway are directed into primary and secondary passageway segments to mix and then be discharged from the engine as a supersonic mixed flow. In the noise suppressing mode, it is desirable that the mixed flow be subsonic.

22 Claims, 8 Drawing Sheets

MIXED EXHAUST FLOW SUPERSONIC JET ENGINE AND METHOD

FIELD OF THE INVENTION

The present invention relates to supersonic jet engines and methods for operating the same.

BACKGROUND ART

The design of engines that travel at supersonic speeds (e.g. possibly in the range of Mach 2 to Mach 3 at cruise, or possibly higher), involves a number of problems similar to those encountered in the design of sub-sonic jet engines. Thus, there are with both supersonic and sub-sonic engines the general concerns of weight, size, complexity, reliability, cost, etc., and also concerns relative to performance (e.g. thrust, specific fuel consumption, etc.). However, supersonic jet engines pose some special problems. For example, present day optimized designs for supersonic turbojet type engines are characterized in that these have relatively high jet velocities, and also create a high level of noise. Noise suppression in this type of engine is one of the most critical technical problems to be solved in making an environmentally acceptable commercial supersonic jet transport. Another consideration is that a supersonic jet engine must be designed to function adequately through a broad range of operating modes (i.e. take off and climb, acceleration up to supersonic cruise Mach number, as well as being able to cruise at both subsonic and supersonic speeds). Further, the general concerns relating to both subsonic and supersonic engine are exacerbated by the more stringent performance requirements imposed on supersonic jet engines.

With regard to noise suppression, over the last several decades, there have been many different systems proposed and/or used for suppressing noise. One general approach has been to mix the higher velocity jet exhaust with lower velocity air, and there are innumerable patents and other technical disclosures relating to variations on this basic concept. However, quite often these mixing type noise suppressors will degrade performance. This has been particularly true with supersonic engines. One approach to solve this problem has been to deploy the sound suppressing apparatus in its sound suppressing functioning mode during takeoff and climb and other situations where sound suppression apparatus is needed, and then to provide means by which the noise suppressing apparatus could be "stowed" for other operating modes (e.g. supersonic cruise). However, this takes extra space and adds complexities.

Further, the trend in subsonic turbofan engines has been to build engines with relatively large by-pass ratios so that most of the energy developed by the engine is actually transmitted into the fan. Thus jet noise is lowered and suppression is not required as much. However, in supersonic turbojet engines, when a fan is incorporated in the design, the by-pass ratio is generally quite small (e.g. 0.03 to 0.1), and the fan air is often able to provide not too much more than a cooling function. In some instances, it has been proposed to mix the fan air in a supersonic jet engine with the jet exhaust, and this is in some designs incorporated with an after burner. To the best knowledge of the applicant, this mixing would normally occur while both the fan air and the jet exhaust are both subsonic.

In recent years, there have been discussions in the technical literature on ejectors where there is supersonic mixing. For example, in Volume 21, Number 10 of the AIA Journal, there is an article "Thrust Augmenting Ejectors, Part I", written by Morton Alperin and Jiunn-Jen Wu. A second article appeared in Volume 21, Number 12 of the AIA Journal, bearing the title "Thrust Augmenting Ejectors, Part II", by these same authors. There is an analysis of compressible fluids through a thrust augmenting ejector, and these articles deal with two distinct flows after substantially complete mixing has been accomplished. There is the "first solution", where there is subsonic mixed flow and the "second solution", where there is a supersonic mixed flow. Also there is a later publication which is "NASA Contractor Report 177419", which is authored by Dr. Wu, this being prepared for the Ames Research Center in July, 1986, and both first and second solution ejectors and the tests conducted on these are discussed. Also, there is a publication "Compound-compressible Nozzle Flow", authored by Arthur Bernstein, William Heiser and Charles Havenor, presented at the AIAA 2nd Propulsion Joint Specialist Conference at Colorado Springs, Colo., Jun. 13-17, 1966, and this deals with the behavior of two or more gas streams flowing through a single nozzle.

SUMMARY OF THE INVENTION

The present invention relates to a supersonic jet engine installation, where there is an air intake means to take in ambient air, an engine, a mixing section, an exhaust section, and secondary air passageway means. The ambient air is directed into an inlet of the engine, and also into the secondary air passageway means. The gaseous exhaust from the engine is directed through primary passageway segments in the mixing section, and the ambient air that is directed into the secondary air passageway means flows as secondary air through secondary passageway segments in the mixing section. The primary passageway segments are arranged so that the gaseous exhaust is emitted from the primary passageway segments as primary flow components at supersonic velocity. The engine is also arranged so that the primary flow components emitted from the primary segments mixes in a mixing region of the exhaust section with the subsonic (or near sonic) flow components of the secondary air emitted from the secondary passageway segments, with the mixed flow being emitted as a supersonic mixed flow (i.e., the second solution is achieved).

In a preferred form, the air intake means comprises a common supersonic inlet which receives the ambient air, a portion of which flows into the engine, and a portion of which flows into the secondary air passageway means. Also, in the preferred form, there is selectively operable secondary air passageway valve means having a full open position, a closed position, and moveable to intermediate positions, so as to have full air flow through the secondary air passageway means, no flow, or intermediate flow levels.

In a preferred configuration shown herein, the mixing section is arranged so that the primary and secondary passageway segments are interspersed with one another and in a preferred embodiment shown herein are radially extending and alternately interspersed with one another, so as to enhance mixing. More specifically, in the preferred form, these primary and secondary passageway segments are "pie-shaped" (i.e., expanding in width in a radially outward direction). However, within the broader scope of the present invention, other arrangements for the primary and secondary passageway means could be used, such as parallel passageway segments or other configurations. When the engine installation is operating during certain modes where noise suppression is desired (e.g., take off and initial climb), desirably the engine is operated so that the mixed flow from the engine is subsonic (i.e., in the "first solution"). The mixing of the bypass air with the gaseous exhaust acts to suppress the noise of the engine. In addition, if desired, other noise suppressing devices could be used, such as sound absorbing panels or other noise abatement devices.

In one preferred embodiment, the flow through the primary passageway segments is accomplished by providing a diverging primary exit portions, with diverging converging plug elements positioned at the primary passageway exit portions. By moving the plug elements further into or away from the exit passageway portions, the throat area of the primary passageway segments can be controlled. Further, rear surface portions of the plug elements converge toward one another in a rearward direction, and it is surmised that this arrangement helps to alleviate noise over a relatively broad range.

An alternative embodiment is to provide moveable vanes at the exit end of the primary passageway segments so as to modify the configuration of the throat area of the primary passageway segments. In a specific embodiment shown herein, the primary passageway vanes are pivotally mounted and are radially extending. However, within the broader scope, these could be arranged in other configurations, such as being parallel.

In the preferred form, the air intake means is variable area intake means, and there is a final nozzle section which is a variable area final nozzle section.

Also, the present invention is directed toward a method of operation of the jet engine of the present invention.

Other features will become apparent from the following detailed description.

DESCRIPTION OF THE PREFERRED EMBODIMENT

Figure 1:
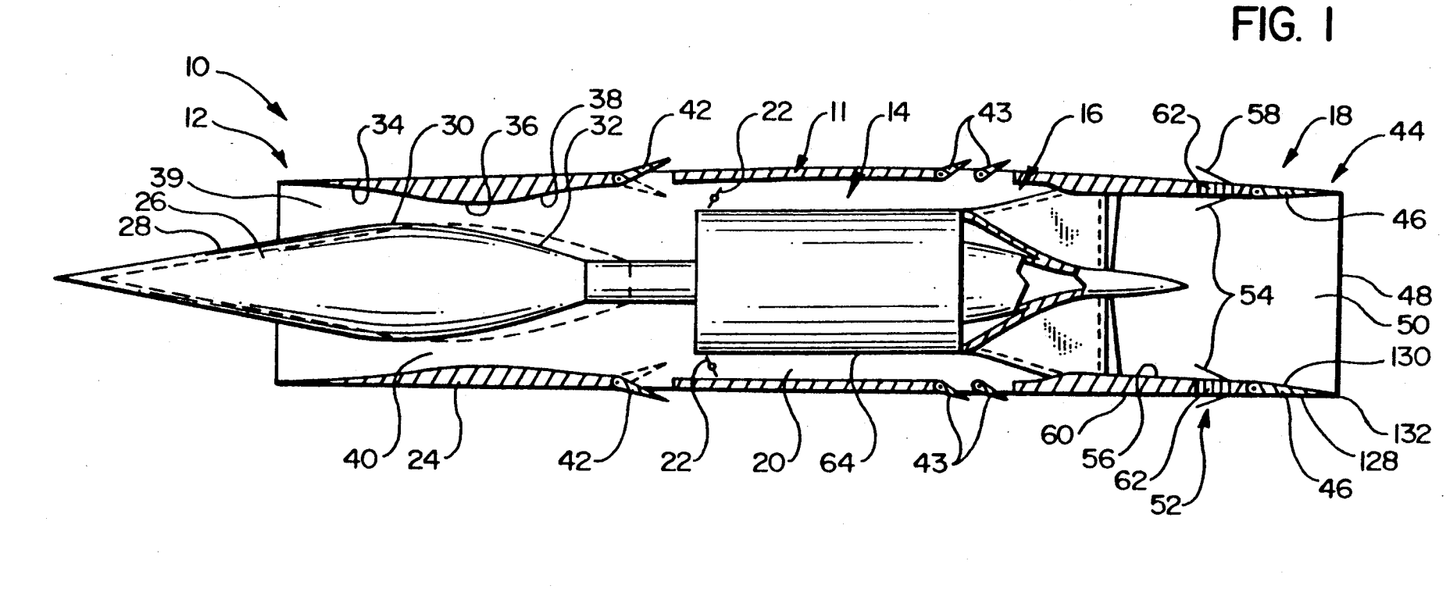
FIG. 1 is a longitudinal sectional view of a first embodiment of the engine installation of the present invention.
Figure 2:
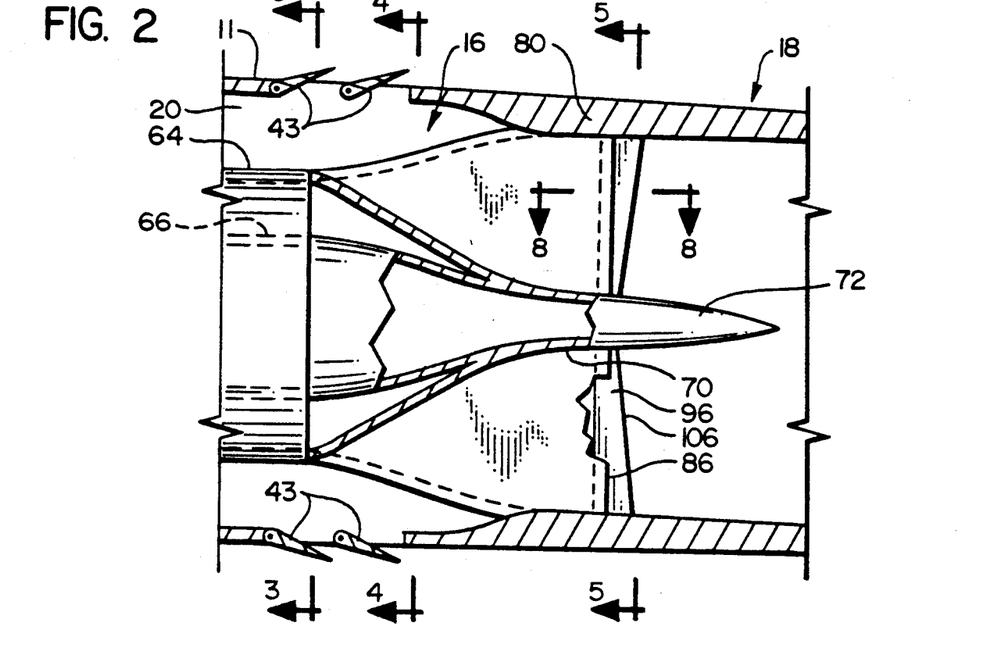
FIG. 2 is a view similar to FIG. 1, drawn to an enlarged scale, and showing only the mixing section of the engine installation.

In FIG. 1, there is shown somewhat schematically a supersonic jet engine installation 10 incorporating the teachings of the present invention. This engine installation 10 comprises an outer annular housing 11, an inlet section 12, an engine 14, a mixing section 16, and an exhaust section 18. In addition, there is a secondary air passageway means 20 desirably in the form of an annular bypass duct defined by the housing 11 and surrounding the engine 14, this passageway 20 leading from the inlet section 12 into the mixing section 16.

The function and operation of the mixing section 16 in cooperation with the secondary air passageway 20 and the other components of the engine are significant in the present invention, and the details of this will be described later in this description. This section 16 is designed to obtain what is called the "second solution" (where there is supersonic mixed flow) for engine thrust improvement, and also for proper noise abatement where the first solution would normally be used. In general, this mixing section 16 functions to direct the exhaust from the engine 14 into a plurality of primary passageway segments which are spaced from one another, and also to direct the secondary flow from the passageway 20 to a plurality of secondary passageway segments, which are interspersed with the first or primary passageway segments. In the preferred configuration shown herein, the primary and secondary passageway segments go through a transition portion and end at a downstream location in a plurality of "pie shaped" sections, with the primary passageway segments and the secondary passageway segments being spaced in an alternating pattern.

Further, the primary passageway segments are preferably contoured with a converging diverging configuration to reduce shock cell noise and improve performance, such that the sub-sonic primary flow entering the primary passageway segments turns supersonic as it exits from its expanding primary passageway segment, this desirably being accomplished in the first embodiment with plug elements, as described later herein. Further, in the preferred form the primary passageway segments are arranged so as to vary the area of the throat of the primary passageway segments to optimize the operating mode of the engine at all flight conditions. The details of this section 16 will be described later herein.

It will be noted that the inlet section 12 is properly sized and arranged as a common inlet to supply adequate airflow to both the secondary air passageway 20 and also into the inlet of the engine 14. In addition, there is at the forward entry portion of the secondary passageway 20 a flow control valve means 22 which can selectively block all or part of the flow into the secondary passageway 20.

The inlet section 12 is shown as an axisymmetric inlet, a type which has been used for the U.S. Supersonic Transport and this is at this time the favored inlet configuration. However, other supersonic inlets could be used. Within the broader scope of the present invention, the inlet could have various configurations such as axisymmetric, rectangular, or some other shape. Further, while the preferred form is to have a common inlet to minimize losses as the supersonic inlet air flow turns subsonic downstream of the inlet throat, within the broader scope of the present invention, other arrangements are possible, and the inlet means could also comprise, for example, a separate annular passageway to take in secondary air flow, or possibly a plurality of inlet secondary passageways for ambient air. The inlet section 12 shown herein comprises an inlet outer housing portion 24 and a translating center body 26. As is common in the prior art, the center body 26 has a forward surface portion 28 that diverges in a downstream direction, a greater diameter center surface portion 30, and a rear surface portion 32 that converges in a downstream direction. The inlet housing portion has an annular configuration, having a rearwardly converging forward portion 34, a reduced diameter middle portion 36 and a rear surface portion 38 that diverges in a downstream direction. As is well known in the prior art, the housing section 24 and the center body section 26 define a convergent divergent passageway 39, with an intermediate "necked" portion 40. This is desirably a variably geometry inlet where the center body 26 is movable relative to the inlet housing to modify the geometry of the inlet passageway. At the aft end of the inlet housing portion 24, just forwardly of the secondary passageway 20 and also just forwardly of the flow control valve means 22, there are inlet by-pass doors 42 which (as their name implies) can function to open to divert air flow from the inlet passageway downstream of the necked portion 40 to a location outside of the engine when they are moved outwardly. Also these doors 42 can be positioned to extend inwardly to take in additional air, and this is shown in broken lines in FIG. 1. Similar doors 43 are provided at the rear end of the secondary passageway 20.

The engine 14 is or may be of conventional turbojet or turbofan design and would normally comprise a forward compressor section, a burner section which receives air from the compressor section, and a turbine section. Since these components are well known in the prior art, these will not be illustrated nor described herein.

The exhaust section 18 comprises a variable area nozzle 44 which is or may be of conventional design. Typically such a variable area nozzle comprises a plurality of flaps 46 which can be moved radially inwardly or outwardly to change the exit area 48 of the exhaust passageway 50. Additionally, a suitable thrust reversing mechanism 52 is provided, this being shown somewhat schematically in FIG. 1. As shown herein, this thrust reverser 52 would comprise selectively operable intake vanes 54 which can be moved from a flush position adjacent to the interior housing surface 56 to a radially inward location to capture the outlet flow, and also a plurality of perimeter outlet vanes 58 which can be moved outwardly from a flush position adjacent to the outer surface 60 of the engine housing 11. A set of turning vanes 62 is positioned in the aft part of the housing structure 11 between the sets of vanes 54 and 58 to redirect the gaseous flow entering into the area defined by vanes 54, and discharging this gaseous flow in a forward direction in a radially outward and forward direction along the radially outward vanes 58.

To describe this mixing section 16 more particularly, reference is now made to FIGS. 2 through 8. The engine 14 has an outer generally cylindrical side wall 64, and an inner wall 66 (see FIG. 2) positioned concentrically within the outer wall 64, and these are extended into the mixing section 16. The downstream portions of these walls 64 and 66 define an annular passageway section 68 which receives the exhaust from the turbine section of the engine 14.

Figures 3, 4, 5:
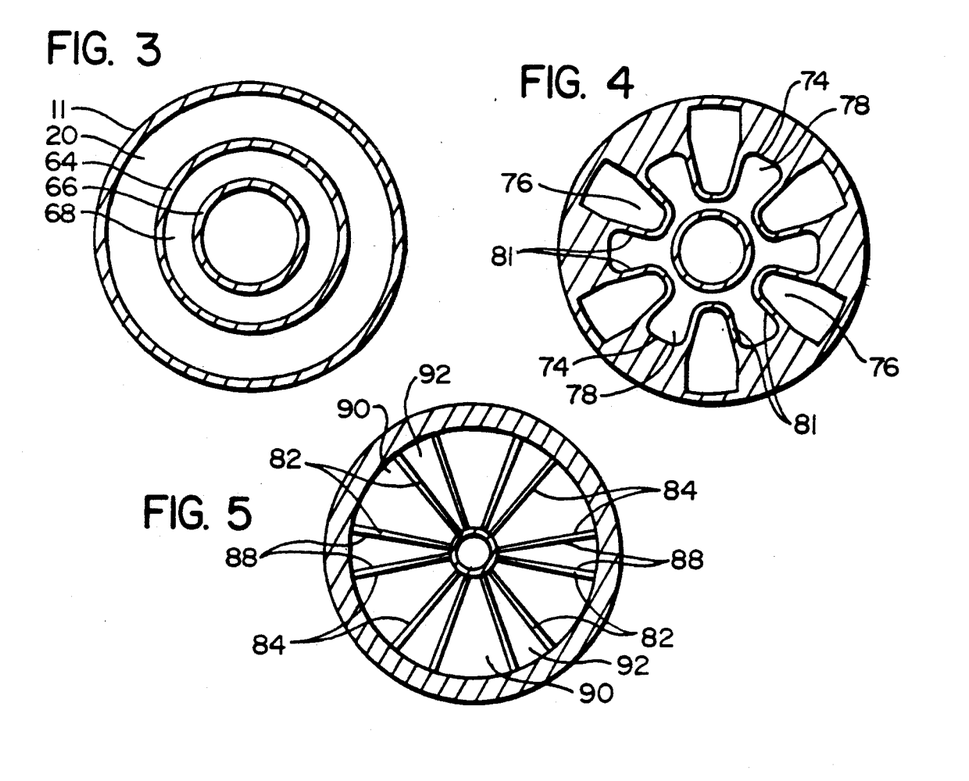
FIGS. 3, 4 and 5 are sectional views taken through lines 3, 4 and 5, respectively, of FIG. 1, illustrating the configuration at locations along the mixing section, but not showing the aft blow in doors, for ease of illustration, and not showing the plug elements for the primary passageway segments.

The outer engine wall 64 is contoured in a manner that as it extends rearwardly into the mixing section 16, it goes through a transition from a forward cylindrical configuration to an intermediate "flower" or "lobe" transitional configuration (see FIG. 4), and finally at the exit plane has a substantially "pie shaped" configuration (see FIG. 5), where each passageway section has a substantially triangular shape (as viewed from the transverse plane of FIG. 5). The base of each triangular shape is circularly curved, and the radially inward apex of each triangle is cut-off or terminated at the outer surface 70 of the plug 72 which is an extension of the wall 66 at the exhaust of the mixing section 16. It is to be understood that this contouring of the downstream portion of the wall 64 is accomplished in a manner to provide smooth fluid flow through the mixing section 16. It is to be understood that there could also be a "two dimensional" embodiment where the wall sections forming the passageway exit segments are parallel, and the exhaust pattern could be rectangular rather than pie shaped.

More particularly, as can be seen in FIG. 4, certain spaced portions around the wall 64 slant outwardly in a rearward direction to form radially outwardly positioned lobe portions 74 having intermediate valleys 76. At the intermediate location of FIG. 4, the hot exhaust gases continue their rearward flow from the more forward passageway portion 68 into the interior transitional passageway portions 78 defined by the lobes 74, while the secondary air has a portion of its flow traveling radially inwardly into the valleys or recesses 76. By the time this flow reaches the exit area (see FIG. 5), the lobe portions 74 extend out nearly to the housing 11. At the aft end of the mixing section 16, there is mounted to the engine housing 11 a circumferential mounting ring 80 which will be described in more detail later herein.

Figures 7, 7A, 8:
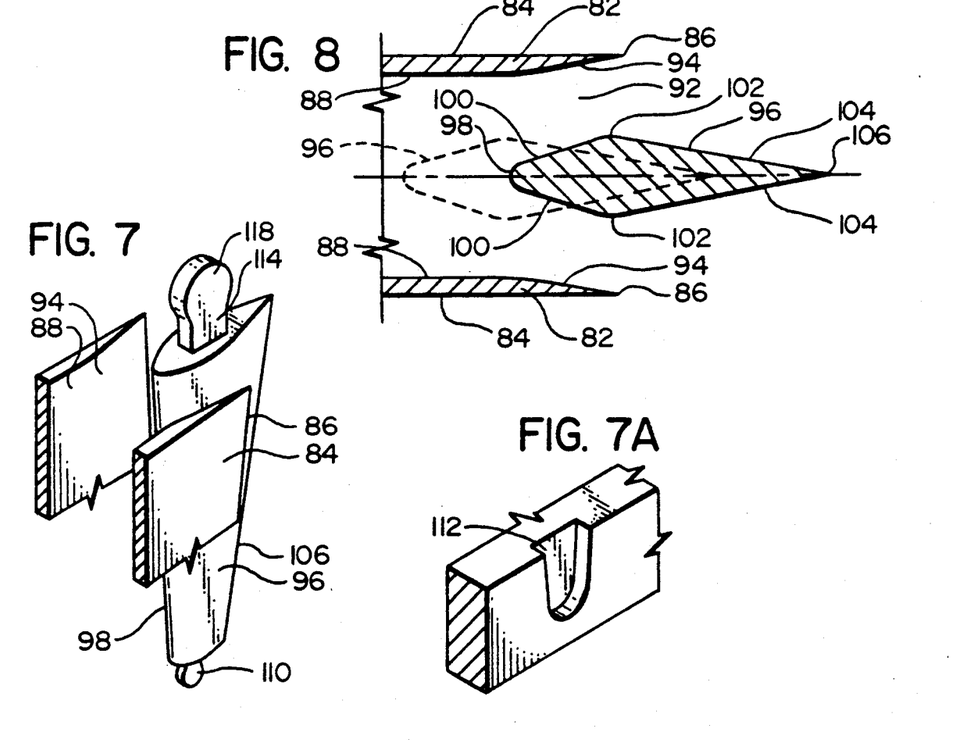
FIGS. 7 and 7A are an exploded isometric views showing one of the plug elements of the mixing section with portions of adjacent rear wall sections, and also a central mounting means for the plug element.
FIG. 8 is a sectional view taken along line 8—8 of FIG. 2, showing one of the plug elements positioned at two different locations between two adjacent mixing plate sections.

To describe the mixing section further, as can be see in FIGS. 4 and 5, the wall portions 81 that define the valleys 76 continue to go through the transition from the location of FIG. 4 to FIG. 5, so that these become substantially planar radially extending rear wall portions 82 arranged symmetrically at the exit area of the mixing section 16. As can be seen in FIG. 8, each rear wall portion 82 has a first side surface 84 which remains substantially planar all the way to the rear end edge 86, and each pair of adjacent facing wall surfaces 84 define a related exiting flow passageway portion for the secondary air.

The opposite side surface 88 of each rear wall portion defines with each adjacent wall surface 88 a related exit flow passageway segments for each flow path of the primary exhaust. The pie shaped secondary exit passageway segments are designated 90, while the primary exit passageway segments are designated 92. As can be seen in FIG. 8, the downstream portions 94 of each set of facing surface portions 88 curve divergently from one another toward the rear edge 86.

To obtain proper converging diverging flow through each primary passageway segment 92, there is provided for each passageway segment extending plug element 96. As can be seen in FIG. 8, each plug element 96 has in cross-sectional configuration (cross-sections taken transverse to the lengthwise axis of each plug element 96) a blunted leading edge portion 98 and two forward surface portions 100 that diverge from the leading edge portion 98 in a rearward direction toward an intermediate side surface area 102. From the surface portion 102, the wall portions 104 converge in a rearward direction to a rear edge portion 106. The cross sectional configuration of each plug element 96 remains substantially symmetrical along the length of each plug element 96 and its cross sectional linear dimensions diminish in a radially inward direction in a generally proportional relationship relative to its distance from the center axis of the engine.

Figure 6:
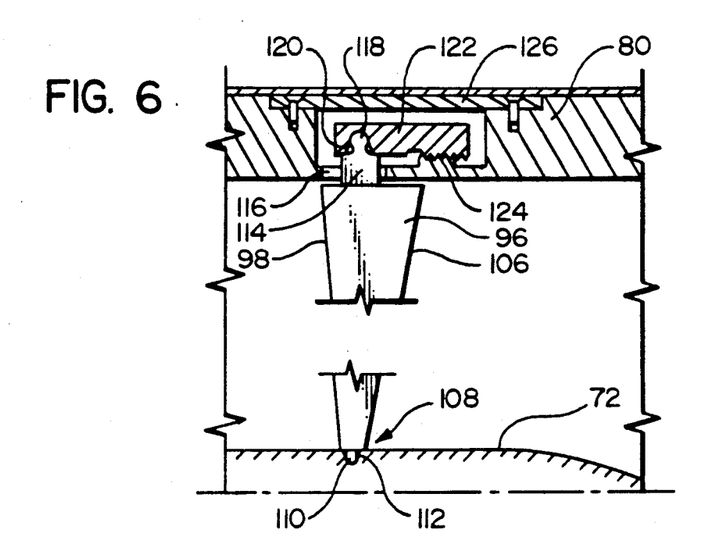
FIG. 6 is a longitudinal sectional view at a rear portion of the mixing section, but showing only a single one of the plug elements of the mixing section and its actuating mechanism, and not showing adjacent rear wall sections.

Each plug element 96 has a pivot mounting 108 at the center plug section 72, this being conveniently formed as a radially inwardly extending finger 110 fitting in a matching recess 112 (see FIGS. 6 and 7). The radially outward end of each plug element 96 has an upstanding finger or element 114 which is positioned in a longitudinally extending slot 116 formed in the aforementioned mounting ring 80. An outer end portion 118 of this finger 114 fits in a circumferentially extending recess 120 in an actuating ring 122 that has a circumferential thread mounting at 124 to the mounting ring 80. It is evident that by rotating the actuating ring 122 in one direction or the other, the radially outward ends of the plug elements 96 can be moved forwardly and rearwardly about their pivot locations 108. A surrounding circumferential cover plate 126 is provided in the mounting ring 80 to seal against leakage around the radially outward ends of the plug elements 96. Other mechanisms that are commonly known could also be used.

It is quite evident from viewing FIG. 8, that as each plug element 96 is moved from a further rearward position (shown in full lines of FIG. 8) to a more forward position (shown in broken lines in FIG. 8), the maximum width portion 102 of the plug element 96 moves further into the throat of the primary passageway segment 92 so as to reduce or vary the throat area in the primary exit passageway segment 92. Thus, these plug elements 96, in conjunction with the aft portions of exit wall sections 82, form what might be called a segmented primary nozzle comprising a plurality of variable area pie shaped exit passageway segments 92.

With regard to the exhaust section 18, as indicated earlier, the flaps 46 can be moved inwardly and outwardly to decrease or increase the effective nozzle area to match the desired aspiration. The flaps 46 are configured so that in the preferred cruise position (shown in full lines in FIG. 1), the outer surfaces 128 of these flaps are aligned with the exterior surface 60 of the outer engine housing 11 so as to form a continuous aerodynamic surface along the outer engine cowl or housing 11. Also, with the flaps 46 in their expanded position, the inner surfaces 130 of the flaps 46 collectively define a rearwardly diverging passageway leading to the end edge 132 at which the surfaces 128 and 130 meet.

In the following description, the mixing section 16 shall be considered as comprising the structure which directs the primary exhaust and the bypass passageway air into the pie-shaped primary and secondary exit passageway segments 92 and 90, and the rear end of the mixing section 16 shall be considered as terminating at the rear edge portions 106 of the plug elements 96. Thus, the exhaust section 18 shall be considered as extending from the location of the plug element rear edges 106 rearwardly to end edge 132 of the flaps 46. It is to be understood, of course, that mixing of the primary and secondary flows will also occur in a mixing region of the exhaust section 18 with substantially complete mixing occurring before or shortly before these primary and secondary flows pass out the final nozzle section 44.

To describe the operation of the present invention, let us first consider the operation of this engine installation 10, FIG. 1, during cruise, and for the sake of example, let it be assumed that the engine installation is designed to cruise at Mach 2.4. Ambient air enters into the inlet section 12, and as it flows past the necked passageway portion 40, the intake air turns subsonic. A portion of the air passing into the inlet section 12 goes into the air inlet of the engine 14, while the rest of this air goes into the passageway 20 as secondary air or aspirated air. As indicated previously, as the secondary or by-pass air moves from the passageway 20 into the mixing section 16, this secondary air is directed into the valleys 76 and then exits through the secondary pie shaped passageway segments 90.

At the same time, the exhaust from the engine 14 passes into the mixing section and through the interior transitional passageway portions 78 and exits through the pie-shaped primary exit passageway sections 92. It can readily be seen by observing the drawing of FIG. 8 that the plug element 96 for each primary passageway section 92 forms a convergent passageway, with the plug rear side surface 104 defining one side of a diverging primary passageway. The effect is that the primary exhaust goes supersonic as it passes beyond the necked passageway portion at the location of the intermediate side surface areas 102.

As the primary exhaust and the secondary air go beyond the rear wall edges 86 of the mixing section 16, the primary exhaust and the secondary air begin to mix. This mixing continues as the two gaseous flows pass into and through the mixing region of the exhaust section 18. The mixing section 16 and the exhaust section 18 are arranged so that substantially complete mixing of the primary exhaust and the secondary air will occur at a location upstream of the trailing edge 132 defined by the flaps 46. In this supersonic cruise mode, the engine installation is arranged so that the mixed flow downstream of the mixing section 16 is supersonic (i.e. in the "second solution" which was discussed previously). The effect of this is that there is a significant improvement of net thrust over what would normally be achieved by present day state of the art supersonic jet engines. While the reasons for this are quite complex, at least a partial explanation can be given with reference to FIG. 9.

Figure 9:
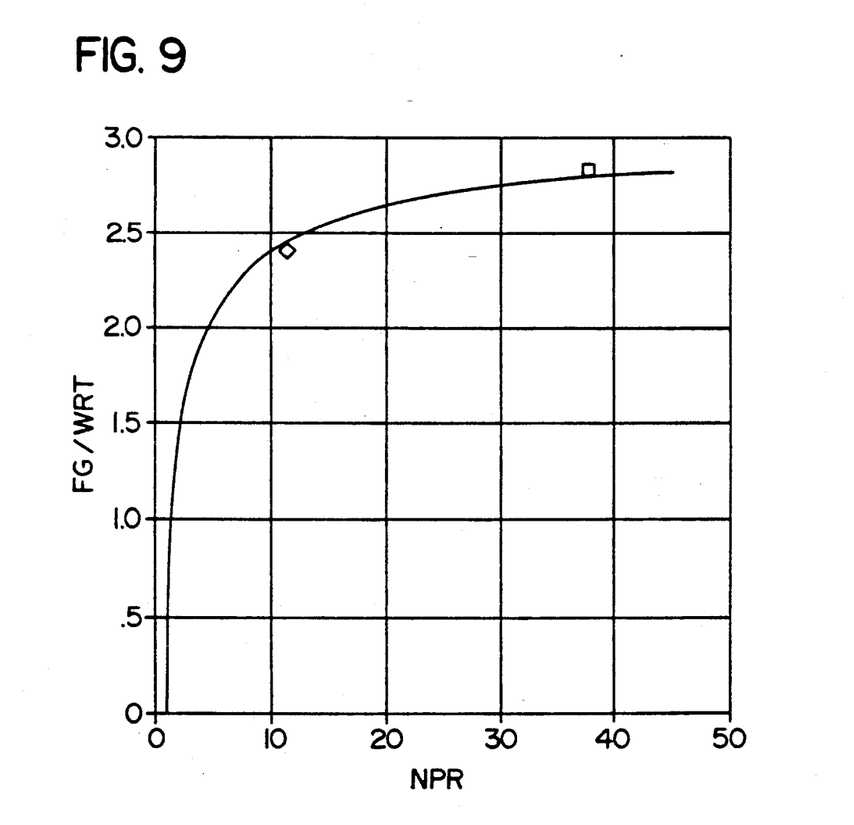
FIG. 9 is a graph where values of pressure ratio of primary flow to ambient atmosphere are plotted against specific thrust.

In FIG. 9, there is shown a graph where the values for specific thrust are along the vertical axis, and the nozzle pressure ratio is given along the horizontal axis (the nozzle pressure ratio being the total pressure of the gaseous flow creating the thrust relative to ambient pressure). It can be seen that as the pressure ratio increases from a little above zero to a value of about eight, the increase in specific thrust is rather rapid. From there on, the curve begins to flatten out somewhat, until the pressure ratio gets up to about twenty five, and beyond this, the increase in thrust is not as large.

At supersonic cruise (e.g. at Mach 2.4), the pressure ratio of the primary exhaust (again, measuring total pressure) to ambient pressure can be as high as thirty eight to one. At that same Mach number, the pressure ratio of the secondary air would be at about eleven to one. In the preferred embodiment of the present invention, the mass flow of the primary exhaust and the secondary air would be approximately equal, with this varying to some extent, depending upon design criteria and other conditions. On the assumption that the two mass flow rates are about equal, when the two gas flows are mixed, the resulting pressure ratio would be at a value of approximately twenty four and a half to one. It can be seen that the specific thrust achieved when the pressure ratio is twenty four and one half to one is slightly less than the thrust which would be achieved when the pressure ratio is at thirty eight to one. On the other hand, there is a relatively much larger increase in specific thrust from a pressure ratio of eleven to a pressure ratio of twenty four and a half. Since the mass flow of the mixed gaseous flow is twice that of the primary exhaust individually and twice that of the secondary exhaust individually, it is apparent that the specific thrust of the mixed flow is greater than the specific thrust that would be achieved by adding the thrust components contributed by the primary exhaust and the secondary air separately if these two were unmixed.

The above explanation is obviously a somewhat simplified and incomplete explanation, and the full explanation would involve the balancing of a large number of other factors, pertaining not only to the specifics of designing the engine to accomplish the functions of the present invention, but also the laws of thermodynamics governing the mixing process.

As indicated previously, a second significant aspect of the present invention is the noise reduction accomplished. By way of background information, shock cell noise is a major problem in connection with primary nozzle expansion. It is a particularly difficult noise source to quiet with acoustic treatment because of its low frequency, and it is therefore much better to prevent it at its source. This is normally done with a converging/diverging (C-D) nozzle which expands the flow isentropically to the local static pressure of the mixing plane. One problem with this technique, however, is that the convergent/divergent nozzle is very "peaky" in that it does a poor suppression job at other than design pressure ratios. However, it also has been demonstrated in the past that plug nozzles in jet engines have been effective in reducing or eliminating shock cell noise over a relatively broad range. In the arrangement of the present invention, it is surmised that the plug elements 96 are accomplishing the function of effectively suppressing the shock cell noise over a relatively broad range.

It will be noted that each of the plug nozzle elements 96 has rearwardly converging rear side surfaces 104 that meet at the rear edge 106, and that the location of the rear edge 106 is behind the rear edges 86 of the rear wall portions 82. Thus, as the flow passes the necked portion of the primary exhaust passageway 92 so as to turn supersonic, the supersonic flow passes along these side surfaces 104 as it begins the mixing process with the secondary flow portions.

With the foregoing in mind, let us now review the operation of the present invention from take-off up to supersonic cruise. The following description of mode of operation will be made with reference to one design of a subsonic jet engine of the present invention which is optimized to cruise at about Mach 2.4. During take-off, noise suppression is, of course, critical. At take-off, the inlet plug 26 is at its furthest forward position for maximum throat area. Further, the by-pass doors 42 and 43 are open in an inwardly facing direction so that these act as flush inlets to take in yet additional ambient air. The by-pass passageway valve means 22 is fully open, and the plug elements 96 in the mixing section 16 are near the minimum area position which would be a more forward position. The final nozzle 44 is set so that the final nozzle area is about ten percent less than the total area of the mixing region that is immediately downstream of the rear edges 86 of the wall portions 82. In this operating condition, the engine 10 develops sufficient thrust for take-off and climb. At the same time, the flow of secondary air through the passageway 20 and through the mixing section 16 and exhaust section 18 functions to mix with the primary exhaust in a manner to suppress sound. During the take-off and climb up to about Mach 0.6 the engine 10 is desirably operated so that the mixed flow (i.e. the combined flow of the primary exhaust and the secondary air) is subsonic (i.e. in the "first solution"), primarily for reasons of noise reduction.

Also, during take-off and through initial climb, acoustic lining would be used to absorb the mixing noise, and this would generally be deployed in the mixing area that it is immediately downstream of the mixing section 16. Also, as the airplane increases its speed during climb up to Mach 0.6, the by-pass doors 42 and 43 are gradually closed as the speed of the aircraft increases, until at about Mach 0.6, the by-pass doors 42 and 43 are fully closed. Also when the airplane reaches a speed of about Mach 0.6, if deployable acoustic lining is used, it would be moved to its stowed position so as not to detract from the performance of the engine.

Also, at about Mach 0.6, the aircraft will have likely reached a location where the noise suppression is less critical, and it is then desired to operate the engine in a manner that the mixed flow passing out the final exhaust section is supersonic (i.e. operating in the "second solution"). The manner in which this is accomplished will be described later herein, and at this point we will assume that this has been accomplished so that from Mach 0.6 on through supersonic climb, the mixed flow is supersonic. (As indicated previously, with this mixed flow being supersonic, a significant increase in specific thrust is experienced).

As the aircraft is traveling from take-off up to about Mach 0.6, the exit area of the final nozzle is reduced, and then the area of the final nozzle begins expanding from Mach 0.6, so that at about Mach 1.0 the area of the final nozzle is about fifty percent of the total area of the mixer. At about Mach 1.6, the final nozzle 44 would be set at about seventy five percent of the total area at the exit plane of the mixing section 16.

As the airplane continues up through climb, during which the airplane is accelerating up toward Mach 2.4, the final nozzle 44 will continue to have its area expanded, and as the airplane is still climbing (and closely approaching Mach 2.4), the final nozzle area is about fifty percent greater than the total mixing area at the exit plane of the mixing section 16. At this point, the airplane begins to operate at supersonic cruise (at Mach 2.4 in the present example) where thrust equals drag, and the area of the final nozzle 44 would be substantially equal to the total cross-sectional area of the engine. It should be noted that the operating sequence described immediately above is based upon the assumption that there is not variable wall geometry in the mixing section 16. Such variable wall geometry will be discussed later herein.

Also, at supersonic cruise (i.e. at Mach 2.4) in the particular design in connection with which this operating sequence is given, the secondary air valve means 22 is closed down moderately to reduce the flow of secondary air into the passage 20. In this particular instance, this is done to obtain a better overall balance in performance. This reduction of the secondary air flow by closing the valve means 22 moderately causes some thrust loss at cruise, but does improve performance at other operating conditions. This helps to maintain the smallest possible inlet to reduce transonic by-pass and spillage drag. The moderate closing down of the by-pass valve 22 would possibly begin at a little bit below cruise speed of Mach 2.4 while the airplane is still in the climbing mode. A current analysis indicates that this would begin possibly at about Mach 2.2, and then gradually close down to some extent until cruise speed at Mach 2.4 is reached.

As the airplane starts at take-off and goes up through climb, the inlet center body 26 is adjusted to some extent throughout this period, and it would possibly be moved further rearwardly so as to reduce the throat area and also to locate the shockwaves coming off the front point of the center body plug so as to minimize inlet drag. At supersonic cruise where thrust equals drag at Mach 2.4, the center body plug 26 in the inlet is moved further rearwardly to open the throat by about twenty percent in area. Also, at supersonic cruise the plug elements 96 in the mixing section 16 are then moved from the forward position (where these provide a smaller area for the necked portion of the primary exhaust passageway segments) to a rearward position so as to open up the throat area of each primary passageway segment 92 by about twenty percent of area.

In the particular design with regard to which the above operating sequence is given, the by-pass duct 20 is sized, relative to the engine 14, so that the mass flow of the air in the secondary passageway 20, when the valve means 22 is wide open, would be about equal to the mass flow of the exhaust from the engine. In terms of actual cross-sectional area, the cross-sectional area of the secondary duct 20 would be somewhat larger (possibly fifty percent larger) than the flow area of the exhaust leaving the engine 14 and just prior to entering the mixing section 16.

With regard to the primary exhaust passageway segments 92, when the plug elements 96 are in their more forward position which they would normally assume all the way through climb and acceleration (up to supersonic cruise), the area at the throat created by each plug element 96 would be about one-fifth of the total mixing area immediately downstream of the tail end of the plug element. Also, the area of the by-pass duct 20 would be about fifty percent greater than the total mixing area at the rear edges 106 of the plug elements 96. This would help keep the losses down for the by-pass air flowing through the duct 20, and this by-pass air will begin to accelerate as it goes into the mixing area and thus require a smaller cross-sectional flow area.

As indicated previously, while in the presently described embodiment the engine 14 is a turbojet engine, this engine 14 could also be a fan jet engine. If so, it would normally be expected that there would be some mixing of the primary exhaust and the fan air prior to going out the nozzle of the fan engine. Further, the exhaust from the turbofan engine or the turbojet engine (if used in the present invention), could be heated by an after burner. Within the broader scope of the present invention, the engine 14 is simply an engine adapted to be constructed and designed to provide thrust adequate for operation as a supersonic engine, and the precise configuration of this engine 14 could take various forms.

It was mentioned earlier that in the preferred form of the present invention, for noise abatement the engine installation 10 would be operating in a manner that during take-off and through climb up to an intermediate supersonic speed (e.g. Mach 0.6), the engine would desirably be operated with the mixed flow being subsonic (i.e. in "solution one"), and that thereafter, for improved performance it is desirable that the mixed flow passing out the final exhaust nozzle be supersonic (i.e. in "solution two"). Operation in "solution one" is fairly easy to demonstrate in a test. However, analytical and test results have demonstrated that it may be considerably more difficult to achieve "solution two" mode of operation, at least in a test setup. Accordingly, it is contemplated that it may be necessary to have a special starting feature or special physical controls to insure the ability to operate in the "solution two" mode. As indicated previously, there is a significant benefit, since this could provide significant thrust improvements over the whole mission, particularly at supersonic cruise.

Certain analytical work which has been done in connection with this matter indicates that "second solution" mode of operation is quite easy to simulate in one dimensional analysis, but that such an analysis does not necessarily give adequate information as to how the "solution two" mode can be achieved in a real system. In addition to extensive one dimensional analysis, certain computational fluid dynamics analysis (CFD Analysis) has shed considerable light on this problem. It is contemplated that a forthcoming test is to be conducted by the assignee of the present invention (i.e. The Boeing Company) in the near future to shed further light on this matter, and this will be used to attempt to verify proposed control logic, as well as devices to accomplish it. At this time, it is believed that the procedure described immediately below is a reasonable means of accomplishing the "solution two" mode of operation adequately.

One system and method for properly accomplishing the "solution two" mode of operation is disclosed in a patent application (CONTROL SYSTEM AND METHOD FOR SUPERSONIC ENGINE WITH SUPERSONIC EJECTOR), naming Garry W. Klees, Gary Lidstone and Robert K. Henke as co-inventors, which patent application is being filed concurrently with the present application.

To describe this more fully, let us assume that the engine installation 10 is operating as described above in climbing through the subsonic range and that the aircraft which the engine is powering is climbing at approximately Mach 6, and that it is desired to change from the "solution one" mode (which is desirable for sound suppression), into the "solution two" mode. The final nozzle 44 is moved to a relatively small area position so that it matches the required flow area under circumstances where the engine is operating in the "second solution" mode at that power setting and Mach number with the by-pass duct 20 open (i.e. with the secondary air passageway valve means 22 at the open position). At approximately the same time, the secondary air valve means 22 is totally closed to shut off the flow of by-pass air through the passageway 20. At this time, the only flow through the final nozzle 44 would be the primary exhaust which is supersonic, since the primary exhaust flow turns supersonic as it passes from the passageway segments 92 in the mixing section 16.

When the valve means 22 is closed, the inlet section 12 may by-pass excess air through the by-pass doors 42 to provide minimum inlet drag. The secondary air valve means 22 is then gradually opened to initiate the flow of secondary air through the mixing section section 16, and this flow gradually increases. The air begins mixing with the supersonic flow of the exhaust segments as these leave the mixing section 16 to provide mixed supersonic flow, and this continues as the valve means 22 continues to be open to the fully open position, at which time the entire mixed flow should be supersonic. With the supersonic mixed flow achieved, the flaps 46 of the final nozzle 44 may then be positioned at any larger area position to achieve the best nozzle performance, depending on the operating modes.

A similar procedure would be followed by an engine out, an inlet unstart, an engine surge, or any unforseen nozzle unstart. It is surmised that the sequence of events is critical to the success of this operation. For example, if the secondary air were to remain substantially at full flow during starting of the "solution two" mode, quite possibly the secondary duct would choke at the mixing plane at the rear end of the mixing section 16, and then if the primary flow is brought up to pressure, there would be a normal shock produced at the end of the mixing process which could not propagate through the nozzle, and thus it could not be started.

Figure 10A:
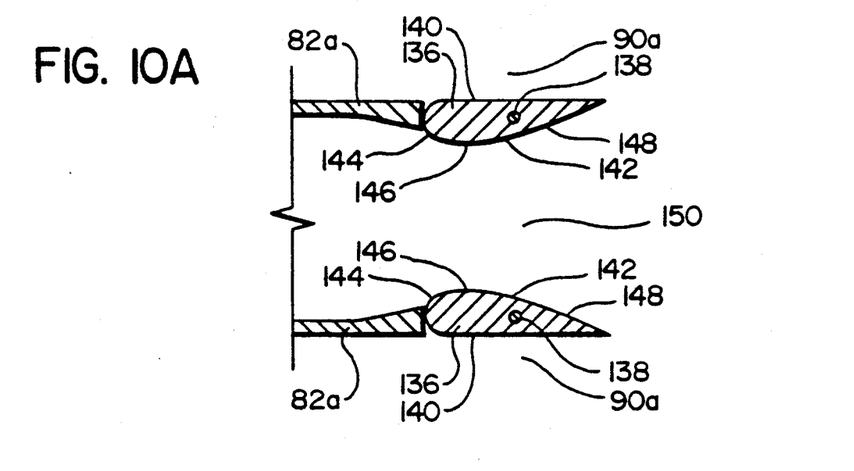
FIGS. 10A and 10B are views similar to FIG. 8, but showing a second embodiment of the present invention, where the flow through the primary passageway segments of the mixing section is controlled by vanes defining convergent/divergent primary passageway segments, with the throat area being modified by movement of pairs of vanes relative to one another.
Figure 10B:
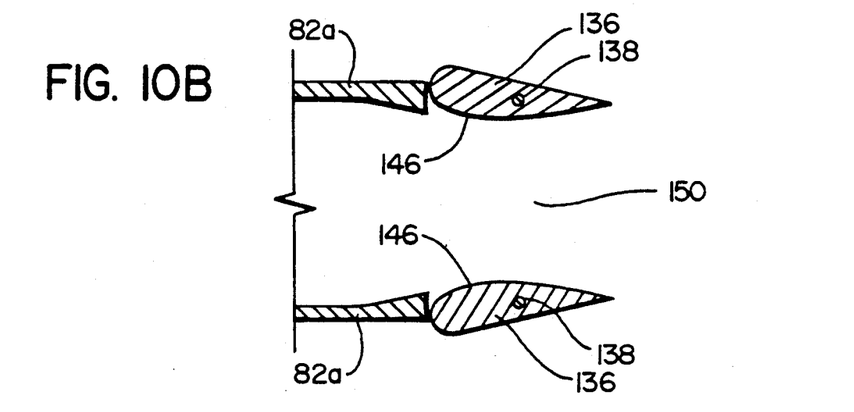

A second embodiment of the present invention is shown in FIGS. 10A and 10B. This second embodiment simply shows a modified arrangement of the primary exit passageway portions. Instead of using the plug elements 96 to control the flow rate and geometry of the passageway exit portions, there are used moveable vanes 136 mounted to the aft end of the rear wall portions 82a of the mixing section 16. Each vane 16 is radially aligned, and it is mounted for rotation about a radially aligned axis 138. Each vane 136 has a first generally flat surface 140, and adjacent facing pairs of the surfaces 140 define the exit portion of the primary passageway segments 90a.

The opposite surface 142 of each vane 136 has a forward inwardly slanted surface portion 144, an intermediate throat portion 146, and a rearwardly diverging surface portion 148. It can be seen that the surface portions 144, 146 and 148 in facing on another form a convergent/divergent passageway 150 through which the primary exhaust component flows.

With reference to FIG. 10B, it can be seen that by rotating the two vanes 136 so that the forward portions thereof move away from one another, the throat area 150 can be increased. This is facilitated by locating the axis of rotation 138 rearwardly of the intermediate throat portion 146.

Figure 11:
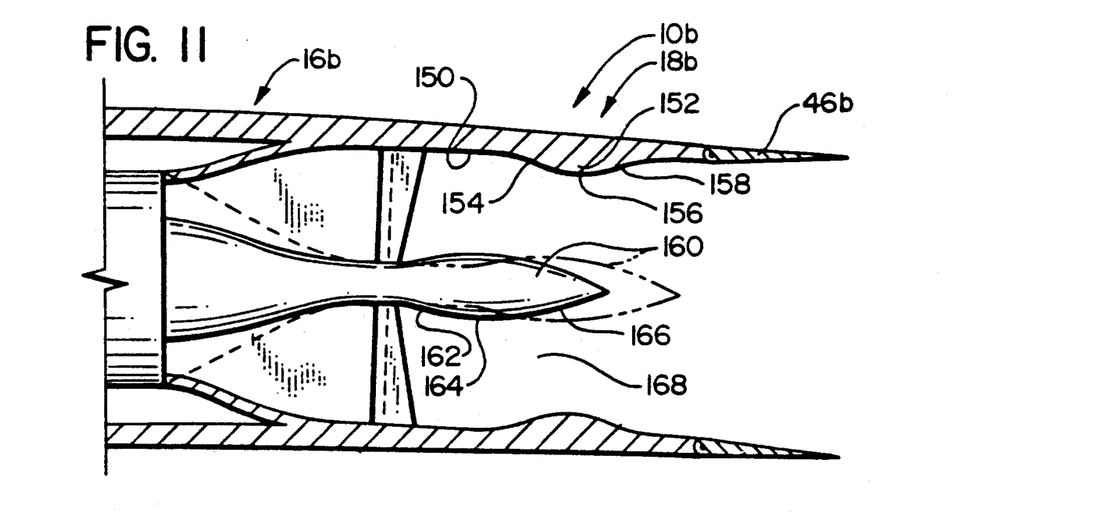
FIG. 11 is longitudinal sectional view of a modified form of the exhaust section of the engine, where a variable area flow restriction is provided.

Another possible modification, adaptation, or improvement for the present invention is illustrated in FIG. 11. The subject matter of FIG. 11 is disclosed in another patent application, "Supersonic Jet Engine with Ejector System", naming David W. Mayer, Russ Thornock, Gerald Paynter, and Mark Sloan as co-inventors. More specifically, this discloses a control means in the form of a restriction aft of the mixing section of the supersonic engine having the basic components and design of the present invention. It is believed it would be helpful to disclose at least one preferred embodiment of that other application.

Certain analytical work was done relative to the subject matter of the present invention, some of this being done with computer fluid dynamic analysis. Such analysis indicated that certain benefits could quite possibly be achieved by using a flow control means in the exhaust section downstream of the mixing section, desirably in the form of a flow restriction, which can be a variable restriction. More particularly, an area in the mixing area aft of the mixing section is first decreased to a throat and then increased to the nozzle exit (a convergent/divergent flow pattern).

With reference to FIG. 11, there is the engine installation 10b having a mixing section 16b and exhaust section 18b, these being essentially similar to the corresponding components of the first embodiment. The interior wall 151 of the exhaust section 18b has a radially inwardly extending annular restriction 152. This restriction 152 has a forward converging surface portion 154, an intermediate minimum area surface portion 156, and a rear outwardly converging surface portion 158.

There is a central aft plug section 160 having a forward rearwardly diverging surface portion 162, a middle maximum width portion 164, and a rear converging surface portion 166. It can readily be seen that the plug element 160 and the restriction 154 form a converging/diverging flow passageway 168. It is further evident that by moving the plug element 160 rearwardly to the broken line position indicated in FIG. 11, the throat area of the passageway 168 can be made smaller.

It is contemplated that the restriction arrangement of FIG. 11 can be utilized to control the secondary flow so as to obtain a proper pressure balance between the primary and secondary flow components passing out of the mixing section 16, and quite possibly other benefits may also be derived from this arrangement.

Figure 12:
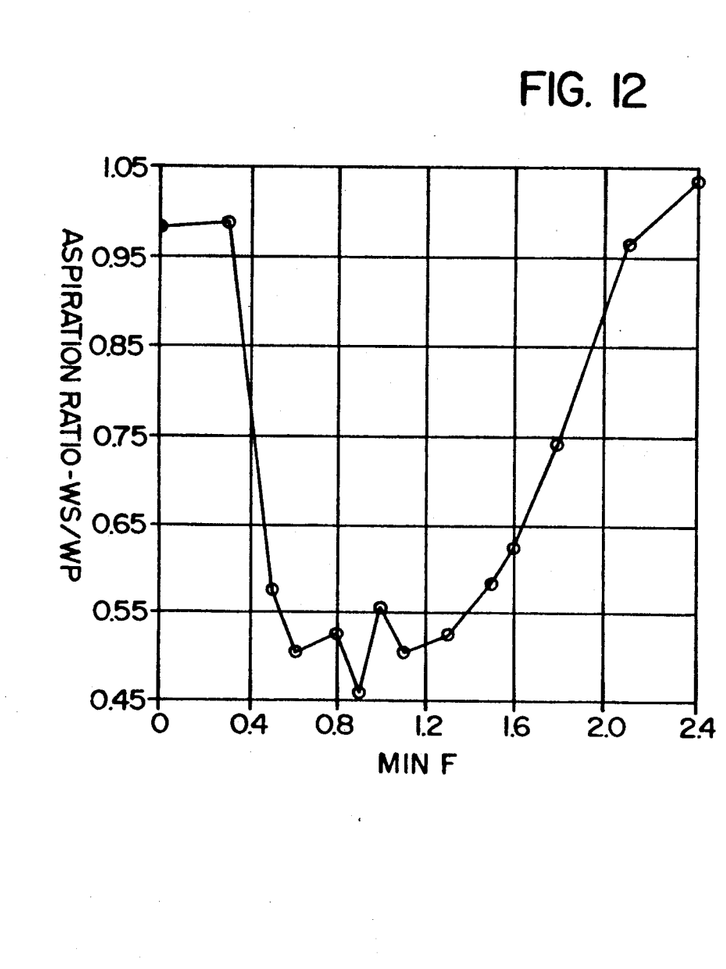
FIGS. 12 through 17 are graphs used to illustrate certain features of the present invention.
Figure 13:
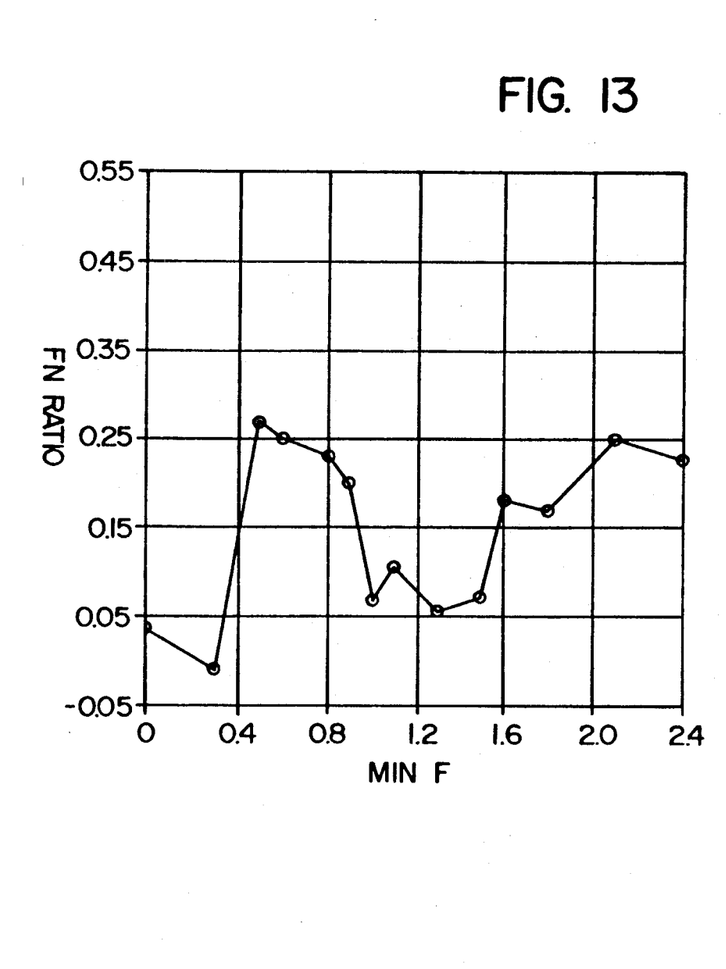
Figure 14:
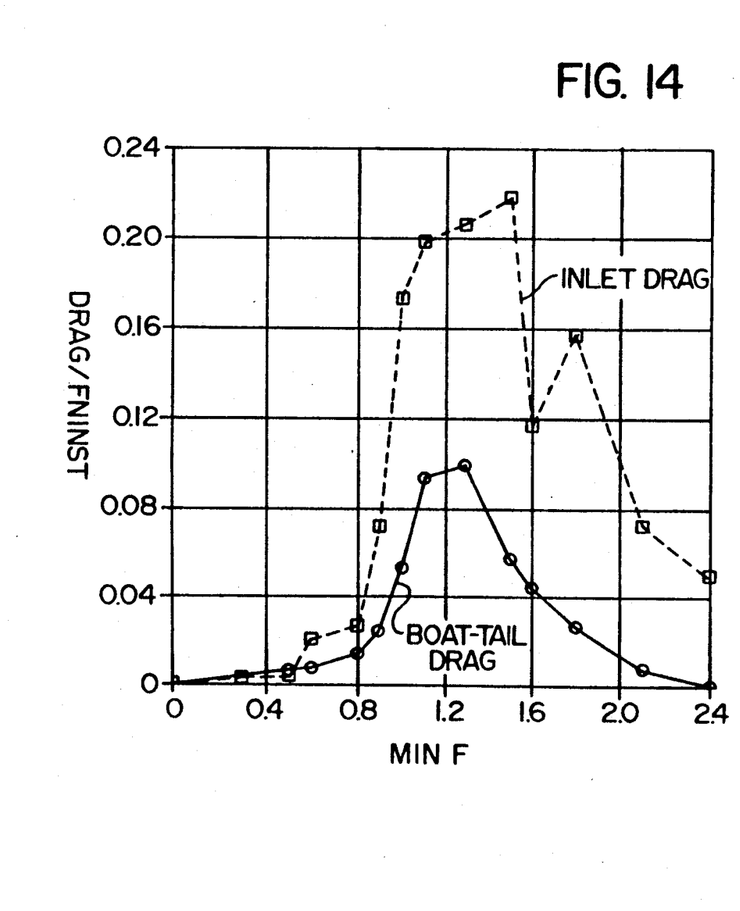

To further discuss certain aspects of the present invention, reference is made to the graphs of FIGS. 12 through 17. The graphs of FIGS. 12 through 14 show certain operating characteristics of a supersonic jet engine installation incorporating the present invention and designed to cruise at Mach 2.4. Further, this engine is designed to meet Stage 3 noise requirements which would currently be imposed on such an aircraft (this, as a practical matter, meaning that the airplane should be as quiet as a present-day 747 airplane). Further, the design is optimized to operate as effectively as possible for the rest of the mission, and this would entail varying the exit area of the final nozzle appropriately.

The current analysis of this engine indicates that by optimizing the design of the engine installation to have a sufficiently high aspiration ratio to achieve the goals of acceptable noise reduction, there is also a significant improvement in net thrust augmentation at supersonic cruise. While the performance is less optimized for certain other operating modes (i.e., during climb when operating from about Mach 1.0 to about Mach 1.5) so that the thrust augmentation is less significant, this is substantially over-balanced by the benefits achieved by the significantly improved thrust augmentation at supersonic cruise.

FIG. 12 plots along the horizontal axis the Mach number, and along the vertical axis the aspiration ratio (which is the ratio of the secondary flow of air through the secondary passageway to the engine exhaust. This graph illustrates the optimized aspiration ratio for improved thrust augmentation, except that the aspiration ratio is higher than would be desirable for optimized thrust augmentation at low Mach numbers since the higher aspiration ratio is needed for adequate noise alleviation. It can be seen that up to about Mach 0.3, the aspiration ratio is at about 0.93 to 0.94, so that adequate aspirated air is provided for noise suppression. Between about Mach 0.5 and Mach 1.4, the optimized aspiration ratio for improved thrust augmentation is in the range of about 0.45 to 0.55. Above Mach 1.4, the desired aspiration ratio climbs sharply until for Mach 2.4, the optimized aspiration ratio is slightly greater than 1.0.

Reference is now made to FIG. 13 where again the Mach number is plotted along the horizontal axis. There is plotted along the vertical axis the net thrust improvement available with the present invention in comparison with state-of-the-art turbojet engine. It can be seen that between zero velocity and Mach 0.3, there is little if any thrust improvement, but that there is sharp improvement up toward Mach 0.5. Then the improvement declines somewhat so that between about Mach 1.0 and Mach 1.5, the improvement is in the range of 0.05 to 0.10. However, as the aircraft approaches Mach 2.0 and on up to Mach 2.4, the improvement is above 0.20. Specifically, it can be seen that at supersonic cruise (i.e., Mach 2.4) at which the aircraft would be operating for a great majority of the time, there is the substantial benefit in net thrust.

FIG. 14 gives an explanation of the dip in thrust augmentation shown in the graph of FIG. 13 for travel between Mach 1.0 and Mach 1.5. Again, the airplane Mach number is plotted along the horizontal axis. Along the vertical axis, there is plotted the ratio of the drag to the total thrust. It can be seen that between Mach 1.0 and Mach 1.5, there is a sharp rise in boat tail drag, this being due to the positioning of the final nozzle. Further, there is a significant rise in inlet drag between these same Mach numbers (i.e., Mach 1.0 and Mach 1.5). This is due in large part to the spilling of the air at the inlet. (However, more current analysis done subsequent to the plotting of this graph would indicate that improvements could be made in the inlet to alleviate this inlet drag substantially.) These two sources of drag are in large part responsible for the decrease in net thrust between Mach 1.0 and Mach 1.5 as shown in FIG. 13. Further, as can be seen in FIG. 14, the boat tail drag goes to zero at Mach 2.4, and the inlet drag is reduced substantially.

Figure 15:
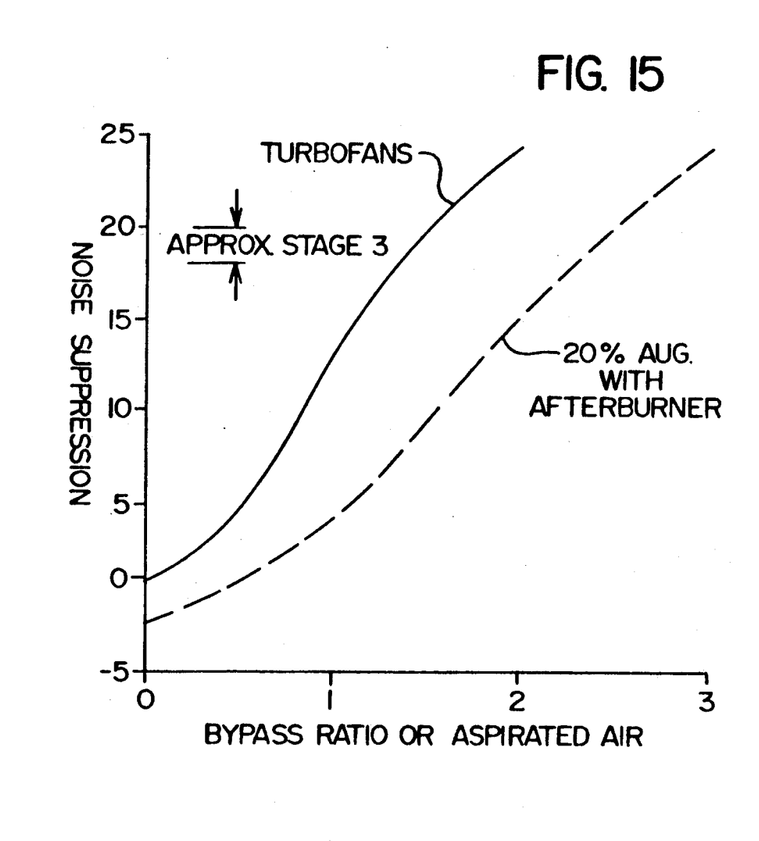
Figure 16:
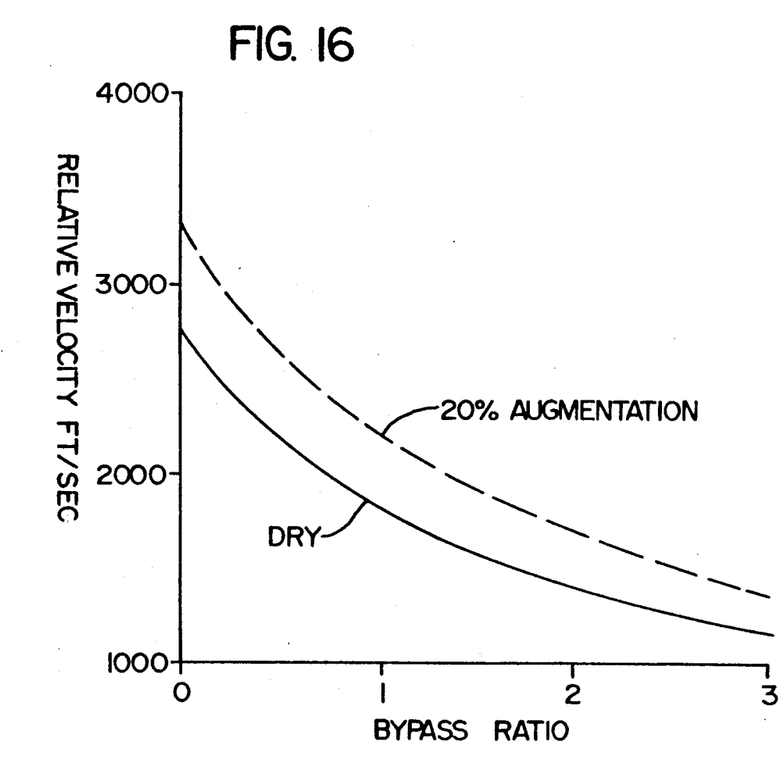
Figure 17:
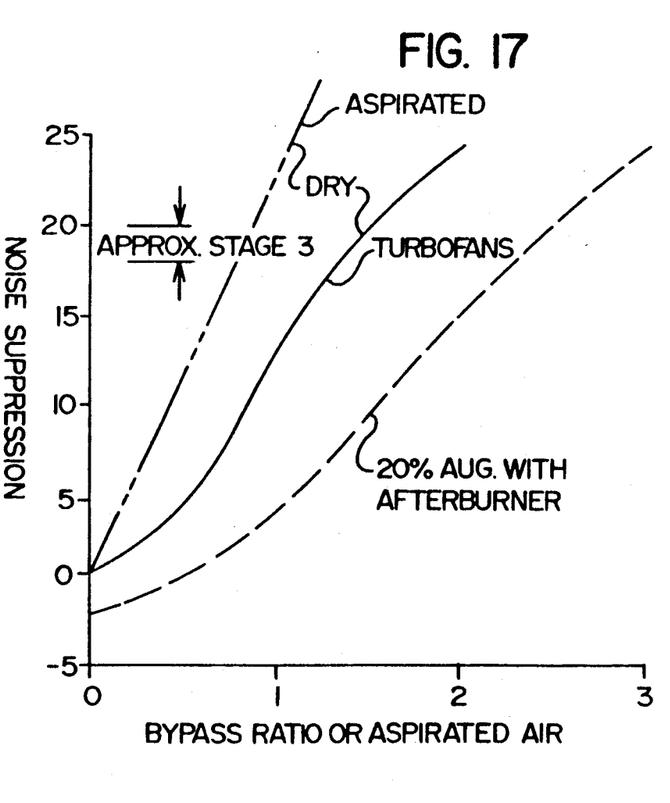

Reference is now made to FIGS. 15-17 to present certain aspects of noise alleviation of the present invention. In FIG. 15, there is shown along the horizontal axis the bypass ratio for a fan jet engine, and along the vertical axis the noise suppression achieved measured in decibels. The solid line curve is where there is no afterburner, and the dotted line curve is with 20% thrust augmentation supplied by an afterburner. It can be seen for the bypass engine without the afterburner that for a bypass ratio of just a little under 1.5, there is adequate noise suppression to achieve the stage 3 requirement. For the augmented engine using an afterburner, the bypass ratio is substantially higher to achieve this level.

In FIG. 16, the bypass ratio is plotted against relative velocity of the mixed flow from a turbojet or a fanjet engine. It can be seen that in the solid line curve that for zero bypass ratio, the relative velocity would be at around 2800 feet per second, and as the bypass ratio increases, the relative velocity decreases. Since the noise generated has a proportional relationship to the ratio of velocity of the jet to the velocity of the ambient air relative to the aircraft, this accounts for the lower noise levels at higher bypass ratios.

FIG. 17 is similar to FIG. 15, but there is also shown the aspiration ratio of the engine installation of the present invention, this being the ratio of the flow of the secondary air to the flow of the engine exhaust. It can be seen that at an aspiration ratio of about 0.9, the stage 3 noise suppression requirement is satisfied. In should be understood that in the preferred embodiment of the present invention, the aspirated air is simply the ambient air which is taken in through the inlet, and the energy of a fan is not added to it. Therefore, the effect of a given amount of aspirated air in causing the mixed flow to be at a lower velocity is more significant.

Therefore, it can be seen by evaluating the graphs of FIGS. 12-17 that the optimized design of the present invention in achieving adequate noise suppression also provides significant operating benefits in terms of the net trust improvement at the higher Mach numbers, and specifically at supersonic cruise.

Thus, in the preferred form of the present invention, the engine installation should be arranged so as to permit flow of secondary air at a ratio of about one to one relative to the primary exhaust at operation during takeoff. Within the broader range, depending upon noise requirements and what other noise abatement devices might be used, this ratio of secondary air flow to primary flow could possibly be about low as three-quarters to one, or even conceivably as low as one-half to one. This would depend upon certain design criteria, and also the intended mission of the aircraft. Also, in the preferred form, the engine installation of the present invention would be designed so that at supersonic cruise, the by-pass ratio (i.e. the ratio of secondary air flow to primary flow) would be approximately one to one. However, at lower secondary to primary ratios, such as three-quarters to one or even as low as one-half to one, a benefit could be realized. Conceivably, even higher ratios of secondary air to primary flow could be used. However, it has to be realized that as the secondary air flow is made greater, the overall diameter of the engine must be made greater, and there is a design trade-off where optimum performance could be achieved, which trade-off should be analyzed for optimization.

Also, in the preferred form of the present invention, the secondary air is simply aspirated air without having energy added thereto (e.g. by a fan or some other sort of augmentation). However, within the broader scope of the present invention, it would be possible that a certain amount of energy could be added to the secondary air, particularly if there was some other design consideration which would indicate this to be desirable. However, present analysis indicates that the present invention would simply have the secondary air brought in without energy added thereto.

It is obvious that various modification could be made in the present invention, and it is also obvious that various teaching from some or all of these other co-filled applications could possibly be incorporated herein advantageously.

What is claimed is:

1. A method of operating a supersonic jet engine installation comprising
   a. providing an engine having a variable area air inlet means and an outlet to discharge engine exhaust;
   b. providing a secondary air passageway means;
   c. receiving ambient air in said air inlet means and providing said ambient air as primary air to said engine inlet and secondary air to said secondary air passageway means;
   d. providing a mixing section having an inlet portion and an exit portion, utilizing said mixing section in directing the exhaust from the engine to primary convergent/divergent exit passageway segments, where said exhaust is discharge at supersonic velocity as primary flow components, and directing secondary air flow from said secondary air passageway means to secondary exit passageway segments which are interspersed with said primary segments and from which said secondary air is discharged at subsonic velocity as secondary flow components; and
   e. providing and exhaust section to receive said primary and secondary flow components in a mixing region and causing said primary and secondary flow components to mix to create a supersonic mixed flow, said exhaust section having a variable area final nozzle through which said mixed flow is discharged.

2. A supersonic jet engine installation comprising:
   a. an engine having an air inlet and an outlet to discharge engine exhaust;
   b. means defining a secondary air passageway means;
   c. an air inlet means comprising a variable area inlet arranged to receive ambient air at supersonic velocity and reduce it to subsonic velocity and to provide said ambient air as primary air to said engine outlet and secondary air to said secondary air passageway means;
   d. a mixing section having an inlet portion and an exit portion, said mixing section being arranged to receive the exhaust from the engine and to direct the exhaust to primary exit passageway segments, where said exhaust is discharged at supersonic velocity as primary flow components, and to receive secondary air flow from said secondary air passageway means and to direct said secondary air flow to secondary exit passageway segments which are interspersed with said primary segments and from which said secondary air is discharged at subsonic velocity as secondary flow components;
   e. an exhaust section to receive said primary and secondary flow components in a mixing region where said primary and secondary flow components mix to create a supersonic mixed flow in at least one operating mode, said exhaust section having a final nozzle through which said mixed flow is discharged;
   f. said primary exit passageway segments being convergent/divergent passageway segments to create said primary flow components as supersonic flow.

3. The engine installation as recited in claim 2, wherein said mixing and exhaust sections are arranged in a manner to create said mixed flow also as subsonic flow for at least one other operating mode.

4. The engine installation as recited in claim 2, wherein said primary exit passageway segments are variable area passageway segments.

5. The engine installation as recited in claim 4, wherein each of said primary exit passageway segments is defined by spaced wall members and a plug element moveable in said primary exit passageway segment so as to increase and decrease a throat area of said primary exit passageway segment.

6. The engine installation as recited in claim 4, wherein each of said primary exit passageway segments comprises moveable spaced vane means that move relative to one another to define variable area passageway segments.

7. The engine installation as recited in claim 2, wherein said inlet means comprises a common inlet which receives air for both said engine and said secondary passageway means.

8. The installation as recited in claim 4, wherein said final nozzle is a variable area nozzle.

9. The engine installation as recited in claim 2, wherein said final nozzle is a variable area nozzle.

10. The engine installation as recited in claim 1, wherein
    a. said inlet means comprises a common inlet which receives air for both said engine and said secondary passageway means;
    b. said final nozzle is a variable area nozzle.

11. The engine installation as recited in claim 10, wherein each of said primary exit passageway segments is defined by spaced wall members and a plug element moveable in said primary exit passageway segment so as to increase and decrease a throat area of said primary exit passageway segment.

12. The engine installation as recited in claim 10, wherein each of said primary exit passageway segments comprises moveable spaced vane means that move relative to one another to define a variable area passageway segment.

13. The engine installation as recited in claim 2, wherein there is a secondary valve means to control air flow through said secondary air passageway means.

14. The engine installation as recited in claim 13, wherein said secondary valve means is able to close off flow to said secondary air passageway means.

15. The engine installation as recited in claim 14, wherein said final nozzle is a variable area nozzle.

16. The engine installation as recited in claim 13, wherein said final nozzle is a variable area nozzle.

17. The engine installation as recited in claim 2, wherein said installation is so arranged that the mass flow ratio of secondary air flow to primary flow is, in take-off mode, at least as great as one-half to one.

18. The engine installation as recited in claim 17, wherein said ratio is at least as great as about three-quarters to one.

19. The engine installation as recited in claim 17, wherein said ratio is at least as great as about one to one.

20. The engine installation as recited in claim 2, wherein said installation is so arranged that the mass flow ratio of secondary air flow to primary flow is, in supersonic cruise mode, at least as great as one-half to one.

21. The engine installation as recited in claim 20, wherein said ratio is at least as great as three-quarters to one.

22. The engine installation as recited in claim 20, wherein said ratio is at least as great as one to one.

* * * * *